Patented Jan. 23, 1934

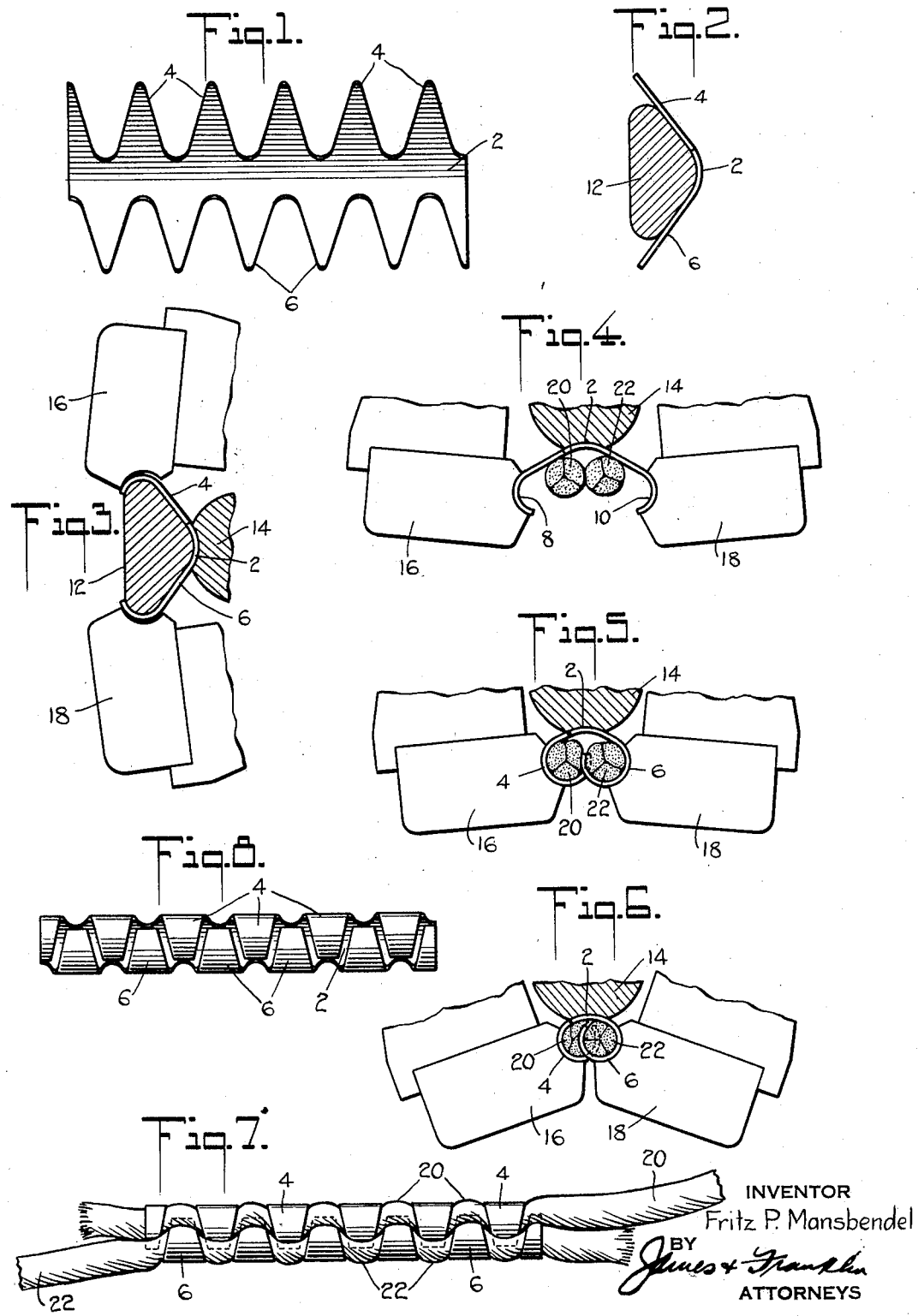

1,944,252

UNITED STATES PATENT OFFICE 1,944,252

ROPE CLAMP

Fritz P. Mansbendel, New York, N. Y., assignor to Fred Goat Co., Inc., Brooklyn, N. Y., a corporation of New York Original application May 28, 1932, Serial No. 614,085. Divided and this application July 29, 1932. Serial No. 625,735

7 Claims. (Cl. 24—123)

This invention relates to the splicing or tying of rope or the like, and more particularly to a clip or fastener for splicing or tying rope, and to the spliced or tied rope resulting from the use of the same.

It is frequently necessary to tie rope or the like in overlapping end to end relation. One example is when splicing the ends of rope in order to obtain increased length. A more common example is for tying rope around bundles, packages, and so forth.

The primary and general object of the present invention resides in the provision of a new and improved spliced or tied rope, and a new and improved clip or fastener for splicing or tying the same, which fastener will be particularly adapted for a quick and expeditious tying or splicing operation. More particular objects of the present invention reside in the provision of such a clip or fastener which will result in a tie or splice of great strength substantially equal to the tensile strength of the rope itself; which will cause each of the rope ends tied together to assume a wavy or sinuous formation weaving in and out of the parts of the fastener; which will be relatively pliable or bendable along its length so that the clip may bend when used for tying a heavy bundle, thereby preventing the connection from being either loosened or the rope cut by the metal; and which in initial condition will be relatively flat or sheet-like in formation, thereby permitting a large number of the clips to be stored in compact stack-like relation in a small space.

Specifically, the present invention centers about the use of a sheet metal clip or fastener provided with oppositely directed spurs or fingers arranged in alternation, which clip is placed over the overlapping ends of the rope to be spliced, and the fingers are then crimped and curled so that the fingers at one side of the fastener curl around one of the ropes, while the fingers on the other side of the fastener curl around the other of the ropes. At this stage of the operation the fingers may, if desired, be curled sufficiently tightly around each of the ropes as to provide a grip thereon, but this feature is entirely optional. After the fingers at each side of the clip have been curled around each of the ropes separately, the clip is then additionally crimped or compressed in order to bring the alternate curled fingers on each side thereof into interlaced or interlocked relation; and it is this which forces each of the ropes to assume the desired wavy or sinuous formation as it weaves through and around the alternate fingers of the fastener, which in turn causes the desired permanent and high tensile strength of the joint between the spliced rope ends.

At the same time, by making the clip out of a moderately soft and pliable metal, such as cold rolled steel, the resulting joint will not be rigid but rather will be bendable because the central or backbone portion of the clip is quite narrow and is not bent for any appreciable distance around the rope.

The present application is a division of my copending application Serial No. 614,085 filed May 28, 1932, entitled "Splicing or tying of rope or the like", which copending application discloses not only the fastener and spliced rope of the present invention, but also a machine for automatically operating upon the fastener.

A few parts of said machine are disclosed and described in order to best explain the preferred mode of use of the clip of my invention.

To the accomplishment of the foregoing and such other objects as may hereinafter appear, my invention consists in the clip or fastener for splicing or tying rope or the like; in the step product resulting from the operation of applying the fastener to the rope; in the spliced or tied rope; as well as the relation of these elements one to the other as hereinafter are more particularly described in the specification and sought to be defined in the claims. The specification is accompanied by a drawing in which:

Fig. 1 shows a preferred form of clip or fastener made in accordance with the present invention;

Fig. 2 is an end view of the same as borne against by the anvil of the feed mechanism of one form of bundling machine utilizing the clip of my invention;

Fig. 3 shows the same at the completion of a preliminary crimping operation caused by oppositely movable crimping jaws cooperating with the aforesaid anvil;

Fig. 4 illustrates how the preliminarily crimped but open clip is placed over a pair of ropes to be spliced;

Fig. 5 shows the curling over of the fingers at each side of the clip around each of the ropes as the crimping jaws are closed;

Fig. 6 illustrates a further stage in the crimping operation;

Fig. 7 is a plan view of a joint, tie, or splice produced by my invention; and

Fig. 8 is a similar plan view of the clip alone with the rope removed, illustrating the interlacing or interlocking of the alternate fingers of the fastener.

Referring to the drawing and particularly to

Fig. 1 thereof, the clip or fastener of the present invention comprises a central strip or backbone section of metal 2 bearing on each side thereof outwardly or oppositely directed spurs or fingers 4 and 6, the fingers 4 on one side of the clip being arranged in alternation with the fingers 6 on the opposite side of the clip, that is, each of the fingers 6 is located opposite the spaces between the fingers 4, and, conversely, each of the fingers 4 is located opposite the spaces between the fingers 6,—all as is readily evident from an inspection of the drawing.

Viewed in side elevation, the clip is preferably in the form of a relatively flat or open V, as is clearly evident from an inspection of Fig. 2 of the drawing. This relatively flat shape, in contrast with the curled shapes illustrated in the following figures of the drawing, is highly desirable in order to permit a mass of the clips to be arranged compactly in closely stacked relation as, for example, in the supply magazine of any appropriate tying machine intended to operate upon the clips, an example of which is disclosed in my copending application previously referred to. It will be understood that the clips may, if desired, be left truly flat or planar in shape, instead of being given the shallow V shape shown in Fig. 2, but the V shape illustrated is somewhat preferable in facilitating the crimping or bending operation subsequently performed upon the clip.

From the standpoint of the actual method of applying the clip to a pair of ropes to be spliced, the clip might even more preferably be given a cross-section such as is illustrated in Figs. 3 and 4, in which the ends of the fingers 4 and 6 are preliminarily curled as is indicated at 8 and 10. This preliminary curling of the tips of the fingers is sufficiently small so that the clip is left wide open and may readily be applied over the ropes to be spliced in a manner self-evident from an inspection of Fig. 4, yet is sufficiently large to insure that the fingers will, upon further compression between a pair of oppositely movable clamping or crimping jaws such as the jaws 16 and 18, roll up upon themselves in a continuous curled relation in a manner evident from an inspection of Fig. 5. It will therefore be appreciated that the clip in the step product form shown in Figs. 3 and 4 is perfectly useful for practicing the invention, and that the relatively flat and open V shape illustrated in Fig. 2 is preferred simply as a compromise between a perfectly flat clip shape which would require much preliminary operation by the crimping machine, and an initially curled clip shape which would prevent close compact stacking of the clips. The preferred shape shown in Fig. 2 facilitates and reduces the machine operations, and yet permits close stacking of a mass of the fasteners.

Accordingly, the relatively flat V-shaped clip shown in Fig. 2 is preliminarily crimped or bent around an anvil such as the anvil 12 shown in Figs. 2 and 3. The anvil 12 may also act as a feed bar for feeding the clips singly from a magazine to crimping mechanism comprising a reaction bar or back bar 14 and oppositely movable crimping or clamping jaws 16 and 18, and, as is illustrated in Fig. 3, the clip 2 is supported between the anvil 12 and the reaction bar 14, while the ends of the fingers 4 and 6 are bent around the curved upper and lower edges of the anvil 12 by the jaws 16 and 18. This preliminary bend of the fingers 4 and 6 is so designed with relation to the movement of the jaws 16 and 18 that continued bending and curling over of the fingers may thereafter be obtained without the use of any intermediate or supporting member such as the anvil 12. Consequently, anvil 12 may be removed, as by sliding the same longitudinally from the clip, and the latter, under the continued three-point support of back bar 14 and jaws 16 and 18, may be moved as desired and, for example, may be placed over the rope ends 20 and 22 arranged in parallel juxtaposition, as is shown in Fig. 4 of the drawing.

Continued movement or squeezing together of the jaws 16 and 18 causes the preliminarily curled ends 8 and 10 to continue to roll over upon themselves and around each of the ropes 20 and 22, as is shown in Fig. 5 of the drawing. At this point it may be mentioned that the length of the fingers of the clip is preferably determined by and in relation to the periphery of the ropes 20 and 22. More specifically, the over-all length of each of the fingers measured from the center line of the clip itself is preferably equal to the circumferential or peripheral dimension of the rope with which the clip is to be used, when the said rope is in a compressed condition. The approximate realization of this condition is illustrated in Fig. 6, for example, but for reasons subsequently explained considerable variation is permissible, so that a given size of clip may be used with a range of rope size, or, what is more important, the clip may be used with a cheap rope as when tying newspaper bundles or the like, the said rope being characterized by changes in dimension from point to point.

It may further be mentioned that the curvature of the fingers in relation to the size of the rope may be so chosen that each of the ropes is gripped by the curled finger even when the ropes are still left in side by side position as shown in Fig. 5. This feature, however, is optional and is relatively unimportant, for the true grip upon and locking together of the ropes is obtained as is next described in connection with Figs. 6, 7, and 8 of the drawing.

Continued compression or squeezing together of the fastener 2 by the jaws 16 and 18 causes the sides of the fastener to move toward one another in a manner shown in Fig. 6 of the drawing which illustrates the position of the jaws and back bar substantially at the end of the crimping operation; and this results in an interlacing or interlocking of the alternate fingers of the fastener, as is best illustrated in Figs. 7 and 8 of the drawing. Fig. 7 shows the resulting joint or tie, while Fig. 8 illustrates the clip of Fig. 7 with the rope removed. It will be observed from an inspection of Fig. 8 that the fingers 4 are meshed with the fingers 6, and it will then be evident, particularly on inspection of Fig. 7, that the ropes are not only surrounded by the fingers, but that the ropes are caused to weave in sinuous formation through and around the alternate fingers of the fastener. Specifically, the rope 20 is surrounded and clamped by the fingers 4; the rope 22 is surrounded and clamped by the fingers 6; the fingers 4 and 6 are forced into meshing or interlocking relationship so that the fingers 4 jam or wedge the rope 22 outwardly between the fingers 6, while the fingers 6 jam or wedge the rope 20 outwardly between the fingers 4; and consequently the ropes 20 and 22 each weave sinuously through and around the alternate succeeding fingers of the metallic clip.

Reverting to Fig. 1, it will be noted that the fingers or spurs 4 and 6 are preferably generally triangular in shape, for this makes possible maximum strength and best utilization of the available metal. A further advantage of the triangular shape is evident from an inspection of Fig. 8 in which it will be seen that the oppositely disposed triangular spurs or fingers come into the desired mesh relation without having to greatly weaken or slenderize the individual fingers. The reduced ends of teeth 4 may be used to force the rope 22 outwardly between the teeth 6, despite the fact that the space between the teeth 6 is moderately small, while at the same time the base of the teeth 4 is wide and sufficiently strong to make the tooth as a whole strong enough for the desired purpose. Furthermore, the use of a triangular tooth very greatly facilitates obtaining the desired rolling action of each tooth as the clip as a whole is compressed, for at the beginning of the rolling action only the narrow part of the tooth is being rolled while the wide part of the tooth is strong enough to prevent buckling or folding at that point. In other words, the progressive widening of the tooth insures a progressive rolling of the tooth under compression. It should also be noted that the teeth are preferably at least a little smaller than the spaces between the teeth because then when the clip is compressed a range of degree of compression may be accommodated, and this in turn permits a range of change of rope size to be accommodated. The great strength of the finished union, as shown in Fig. 7, is, of course, due to the cumulative effect of the series of frictional impedances caused by each of the compressions and bendings of the rope.

The compression of the clip may be carried to the point where the clip becomes substantially cylindrical and only slightly greater in diameter than either of the ropes which are spliced together, thereby making a neat splice or tie. The interlocking connection obtained is fully equal in tensile strength to the tensile strength of the rope itself. At the same time, because of the fact that the metallic splice is made up of many small separate or severed metallic elements interconnected only at the relatively narrow strip or backbone portion 2 of the clip, the splice remains yieldable or bendable, and this is of extreme importance for many purposes, particularly when tying relatively heavy bundles.

The material used for the strip is a relatively heavy gauge sheet metal which is moderately soft and pliable. It may, for example, be cold rolled steel. Hard or springy steel should not be used because the fingers will tend to spring open after being bent. An exceedingly soft material should not be used because it will not retain its shape and grip upon the rope with sufficient strength and permanence. The material is primarily selected so that the individual fingers when forced into shape will hold the desired shape. It is not necessary to select an especially pliable material in order to obtain the desired bendability of the clip as a whole, because this bendability of the clip results primarily, as has already been explained, from the reduction or thinning of the central portion 2 of the clip.

It is believed that the nature and mode of construction and use of my improved clip or fastener and the spliced rope resulting therefrom, as well as the many advantages thereof, will be apparent from the foregoing detailed description thereof. The clips are relatively simple in nature and inexpensive to manufacture. The tying or splicing operation may be performed with extreme rapidity and results in a strong joint or union substantially equal to the tensile strength of the rope itself. The invention is applicable to the splicing of two pieces of rope or to the tying of a single piece of rope around a bundle. The tie or splice obtained is neat and compact and but little greater in diameter than the rope itself. The shape of the metal clip is such that it is yieldable with the rope, rather than stiff and rigid. The rope is forced through and around the successive fingers of the clip in a sinuous manner which insures a tight grip and yet is not cut or permanently weakened by the clip. The nature and shape of the clip are such that despite the relative complexity and desirability of the final union obtained between the two ropes, the apparatus for performing the bending or locking operation upon the clip may be relatively simple. The clips may be supplied and stacked in substantially flat condition.

It will be understood that the length of the clip may be varied in accordance with the strength of splice necessary. Furthermore, the width of the clip or, more particularly, the length of the spurs or fingers of the clip may be varied to accommodate ropes of different size. However, it is important to note that a clip of given width is capable of securely locking together ropes which vary somewhat in diameter, for the grip upon the rope is obtained not primarily by the curling of the fingers about the rope, but rather by the subsequent compression of the clip, resulting in interlacing of the fingers and consequent weaving or sinuousness of the rope. This ability to readily accommodate differences in rope diameter is a very important feature of the present invention because a cheap grade of rope, such as is used for tying newspaper bundles, is not absolutely uniform in diameter but varies considerably along its length. In other words, the precise relation between the size of the clip and the diameter of the rope is not at all critical, and this makes it possible to use a given size of clip for a reasonable range of sizes of rope. However, clips of different size may readily be provided in order to take care of large changes in size of rope.

It will therefore be apparent that while I have shown and described my invention in preferred form, many changes and modifications may be made in the structure disclosed without departing from the spirit of the invention defined in the following claims.

I claim:

1. An intermediate or step product sheet metal clip or fastener for splicing or tying rope or the like, said fastener being made of a metal blank shaped to form a relatively narrow backbone portion provided with outwardly and oppositely directed fingers arranged in alternation upon opposite sides of the backbone portion, said sheet being bent at the backbone portion to assume a shallow or open V shape in cross-section, and the ends of the fingers being curled in such a manner as to insure their being rolled about the remainder of the fingers when compressed toward one another.

2. An intermediate or step product sheet metal clip or fastener for splicing or tying rope or the like, said fastener being made of a blank of moderately soft and pliable steel shaped to form a relatively narrow backbone portion provided with outwardly and oppositely directed fingers arranged in alternation upon opposite sides of the backbone portion, the over-all length of the fingers of the fastener being approximately equal to the compressed circumference of the rope to be tied, said sheet being bent at the backbone portion to assume a shallow or oven V shape in cross-section, and the ends of the fingers being curled in such a manner as to insure their being rolled about the remainder of the fingers when compressed toward one another.

3. As an article of manufacture, a spliced or tied rope comprising rope ends brought into collateral relation, and a sheet metal clip or fastener splicing or tying said rope ends together, said fastener being made of a metal blank shaped to form a continuous portion provided with oppositely directed fingers arranged in alternation upon opposite sides of the backbone portion, said sheet being so bent that the ends of the fingers at the opposite sides of the fastener are brought between the rope ends and are disposed in interlaced relation, whereby each of the rope ends weaves in sinuous formation through and around the alternate succeeding fingers of the metallic fastener.

4. As an article of manufacture, a spliced or tied rope comprising rope ends brought into collateral relation, and a sheet metal clip or fastener splicing or tying said rope ends together, said fastener being made of a metal blank shaped to form a relatively narrow backbone portion provided with outwardly and oppositely directed fingers arranged in alternation upon opposite sides of the backbone portion, said sheet being so bent that the fingers at one side of the fastener are curled around one of the rope ends while the fingers on the other side of the fastener are curled around the other of the rope ends, and the alternate curled fingers are disposed in interlaced or interlocked relation, whereby each of the rope ends is forced in sinuous formation through and around the alternate succeeding fingers of the metallic fastener.

5. As an article of manufacture, a spliced or tied rope comprising rope ends brought into collateral relation, and a sheet metal clip or fastener splicing or tying said rope ends together, said fastener being made of a blank of moderately soft and pliable cold rolled steel shaped to form a relatively narrow backbone portion provided with outwardly and oppositely directed fingers arranged in alternation upon opposite sides of the backbone portion, and said sheet being so bent that the fingers at one side of the fastener are curled around one of the rope ends while the fingers on the other side of the fastener are curled around the other of the rope ends, and the alternate curled fingers are disposed in interlaced or interlocked relation, whereby each of the rope ends weaves in sinuous formation through and around the alternate succeeding fingers of the metallic fastener.

6. As an article of manufacture, a spliced or tied rope comprising rope ends brought into collateral relation, and a sheet metal clip or fastener splicing or tying said rope ends together, said fastener being made of a metal blank shaped to form a relatively narrow backbone portion provided with outwardly and oppositely directed triangularly shaped fingers arranged in alternation upon opposite sides of the backbone portion, said sheet being so bent that the fingers at one side of the fastener are curled around one of the rope ends while the fingers on the other side of the fastener are curled around the other of the rope ends, and the alternate curled fingers are disposed in interlaced or interlocked relation, whereby each of the rope ends is forced in sinuous formation through and around the alternate succeeding fingers of the metallic fastener, the triangular shape of the fingers causing a wedging action upon the bends in the rope ends when the sides of the fastener are compressed together.

7. As an article of manufacture, a spliced or tied rope comprising rope ends brought into collateral relation, and a sheet metal clip or fastener splicing for tying said rope ends together, said fastener being made of a blank of moderately soft and pliable steel shaped to form a relatively narrow backbone portion provided with outwardly and oppositely directed fingers arranged in alternation upon opposite sides of the backbone portion, the over-all length of the fingers of the fastener being approximately equal to the compressed circumference of the rope to be tied, and said sheet being so bent that the fingers at one side of the fastener are curled around one of the rope ends while the fingers on the other side of the fastener are curled around the other of the rope ends, and the alternate curled fingers are disposed in interlaced or interlocked relation, whereby each of the rope ends is forced in sinuous formation through and around the succeeding fingers of the metallic fastener.

FRITZ P. MANSBENDEL.